United States Patent
Zee

(10) Patent No.: US 7,269,749 B2
(45) Date of Patent: Sep. 11, 2007

(54) SYSTEM FOR CONTROLLING LOW POWER MODE OF TV BY USING SINGLE OUTPUT PIN OF MICROPROCESSOR TO SEND SIGNALS TO DEMAGNETIZATION CIRCUIT AND SWITCHED MODE POWER SUPPLY

(75) Inventor: Kum Yoong Zee, Johor (MY)

(73) Assignee: Thomson Licensing, Boulogne-Billancourt (FR)

( * ) Notice: Subject to any disclaimer, the term of this patent is extended or adjusted under 35 U.S.C. 154(b) by 416 days.

(21) Appl. No.: 10/791,343

(22) Filed: Mar. 2, 2004

(65) Prior Publication Data
US 2004/0179320 A1  Sep. 16, 2004

(30) Foreign Application Priority Data
Mar. 10, 2003  (DE)  ................. 032 90 579

(51) Int. Cl.
*G06F 1/32* (2006.01)
*H01F 13/00* (2006.01)
(52) U.S. Cl. .............. 713/320; 713/300; 361/143; 315/8
(58) Field of Classification Search .............. 713/300
See application file for complete search history.

(56) References Cited

U.S. PATENT DOCUMENTS

| 4,445,072 A | * | 4/1984 | Fredres ............... | 315/8 |
| 4,458,178 A | * | 7/1984 | Tenney et al. ........ | 315/8 |
| 5,168,195 A | * | 12/1992 | Breidigan et al. .... | 315/8 |
| 5,175,441 A | * | 12/1992 | den Hollander ...... | 307/43 |
| 5,962,978 A | * | 10/1999 | Lee .................... | 315/8 |
| 6,091,198 A | | 7/2000 | Grilli et al. | |
| 6,208,538 B1 | * | 3/2001 | Halamik et al. ...... | 363/41 |
| 6,434,030 B1 | * | 8/2002 | Rehm et al. .......... | 363/97 |

FOREIGN PATENT DOCUMENTS

| DE | 3418076 | 11/1985 |
| EP | 0436515 | 7/1991 |
| EP | 0874527 | 10/1998 |
| EP | 0964503 | 12/1999 |
| EP | 1058374 | 12/2000 |

OTHER PUBLICATIONS

"CRT Degauss Circuit" IBM Technical Disclosure Bulletin, May 1, 1985, Volume No. 27, Page No. 7158.*
"Multiple AC Input Degauss Circuit" IBM Technical Disclosure Bulletin, Jun. 1, 1990, Volume No. 33, Pages No. 239-240.*
Search Report for EPO Appln. No. 03290579.6 dated Jul. 28, 2003.

* cited by examiner

*Primary Examiner*—Chun Cao
(74) *Attorney, Agent, or Firm*—Joseph J. Laks; Harvey D. Fried; Richard LaPeruta

(57) ABSTRACT

The arrangement and the respective display unit comprise a microprocessor, a demagnetization circuit and a switched mode power supply operating in a normal mode and in a low power mode. The microprocessor is coupled via the same output to the switched mode power supply for controlling the low power mode and to the demagnetization circuit for controlling a demagnetization operation. In a preferred embodiment, the control signal from the microprocessor provides a control for a low power burst mode, and is further combined with a power on-indicative signal via a logical AND combination for controlling the demagnetization circuit.

9 Claims, 2 Drawing Sheets

SYSTEM FOR CONTROLLING LOW POWER MODE OF TV BY USING SINGLE OUTPUT PIN OF MICROPROCESSOR TO SEND SIGNALS TO DEMAGNETIZATION CIRCUIT AND SWITCHED MODE POWER SUPPLY

FIELD OF THE INVENTION

The invention relates to an arrangement comprising a microprocessor, a demagnetization circuit and a switched mode power supply operating in a normal mode and in a low power mode, e.g. a standby mode. The low power mode is in particular a burst mode being controlled by the microprocessor. Arrangements of this type are used for example in display units like television sets and computer monitors.

TECHNICAL BACKGROUND

Switched mode power supplies used in consumer electronics appliances usually have a low power mode, a so called standby mode, in which the essential circuits of the appliance are switched off, and only a few circuits, for example a microprocessor and a remote control receiver, are operating. To keep the power consumption in the standby mode as low as possible, it is known to use in the low power mode a so-called burst mode, in which the switching transistor is turned off regularly for defined time intervals.

For example, the switched mode power supply is switched off and on with a frequency of 100 Hz, in which during a short on phase the switching transistor operates at a switching frequency of 20 kHz, for transferring energy from the primary side to the secondary side of the switched mode power supply. Via the ratio between the on phase and the off phase the output power of the power supply can be controlled. During the on phase, the switching parameters for the switching transistor can be kept within a safe range. Switched mode power supplies with a burst mode are known for example from EP-A-0 386 989 and DE-A-195 18 863.

U.S. Pat. No. 6,434,030 discloses a circuit arrangement with a switched mode power supply, in which a low power burst mode is controlled by a microprocessor. An output of the microprocessor is coupled to the control loop of the switched mode power supply, and when the arrangement is switched to the standby mode, the microprocessor applies a square wave signal with a given duty factor to the control loop. With an off signal from the microprocessor, the power supply is disabled via the control loop, and with an on signal, the power supply is enabled for a short on phase, in which the switching transistor of the switched mode power supply is operating with a regular switching frequency.

Television sets and computer monitors having a cathode ray picture tube (CRT) as a display means comprise usually a demagnetization circuit for demagnetizing the picture tube in regular intervals, for example when the appliance is switched on. For the demagnetization, also known as degaussing, a time period of about 1,5 seconds is used, in which a magnetic field is applied to the picture tube in a known manner. Generally, the demagnetization circuit in a television set operates independently from the micro-processor, but microprocessor-controlled demagnetization circuits are known also.

SUMMARY OF THE INVENTION

According to the invention, the arrangement comprises a microprocessor, a demagnetization circuit and a switched mode power supply operating in a normal mode and in a low power mode. The microprocessor is coupled via one output to the switched mode power supply for controlling the low power mode and to the demagnetization circuit for controlling a respective operation. The output of the microprocessor is in particular arranged as a single pin, for providing the signals to the switched mode power supply and to the demagnetization circuit via the same line.

The inventor has recognized that one output pin of the microprocessor is sufficient for controlling the low power mode, in particular a low power burst mode, as well as for the demagnetization circuit, because the respective control signals do not occur at the same time. There is only one requirement, which should be taken into account: the signal for the low power mode should not be coupled to the demagnetization circuit during the low power mode. This can be realized in a preferred embodiment by controlling the signal coupled to the demagnetization circuit by a power on-indicative signal, which blocks the signal from the microprocessor to the demagnetization circuit during the low power mode, and which allows the signal from the microprocessor to pass during the normal mode. This can be arranged for example via an AND gate, to which inputs the signal from the microprocessor and the power on-indicative signal are coupled. The power on-indicative signal can be for example a supply voltage, which is provided by the switched mode power supply during the on mode, and which is switched off during the low power mode.

BRIEF DESCRIPTION OF THE DRAWINGS

The invention will be explained now in more detail with regard to schematic drawings, which show.

DETAILED DESCRIPTION OF PREFERRED EMBODIMENTS

Figure 1:
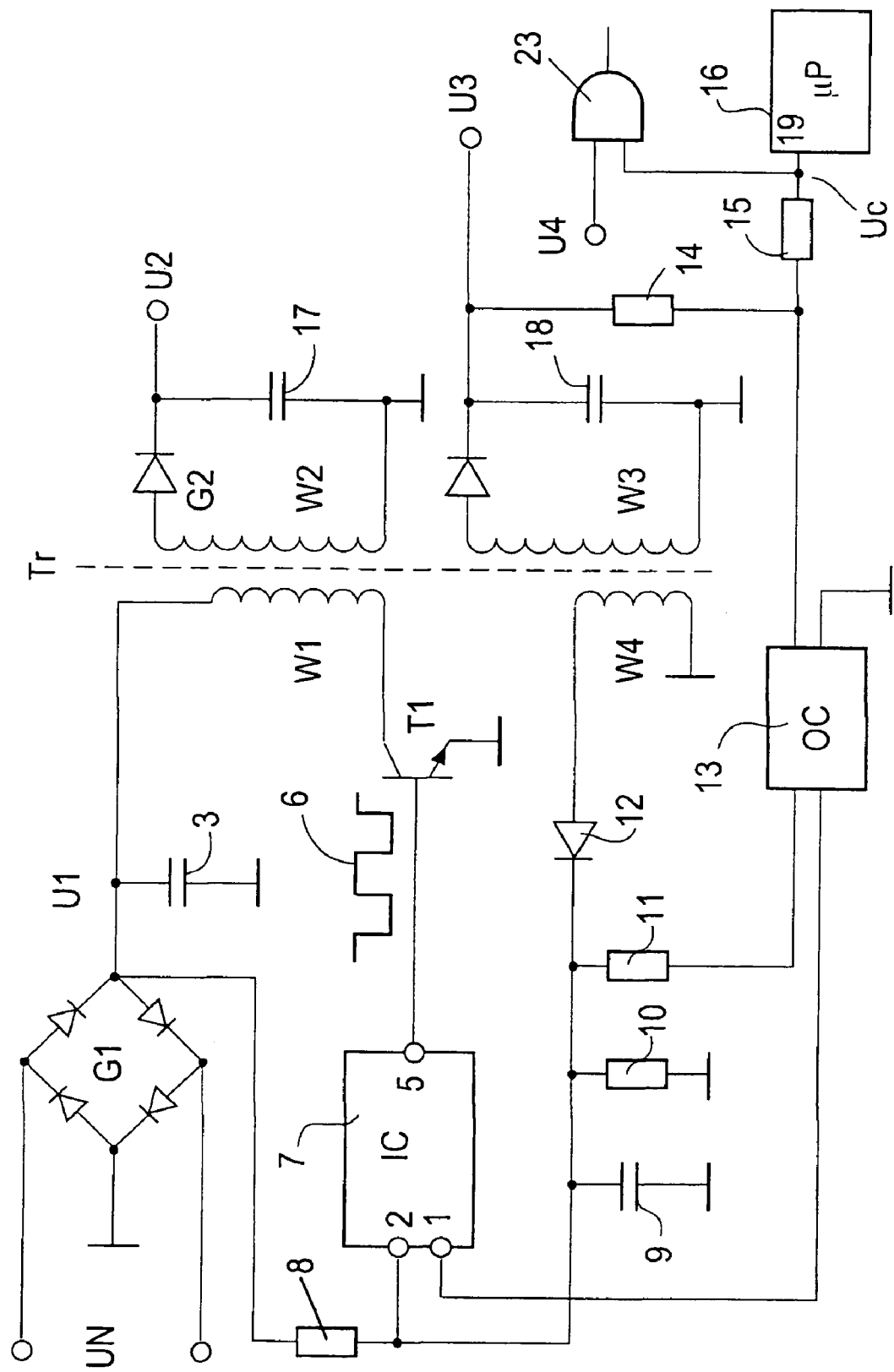
FIG. 1 a switched mode power supply, to which an output of a microprocessor is coupled, FIG. 2 an arrangement for controlling a switched mode power supply and a demagnetization circuit, FIG. 3 a timing diagram showing operation modes of a display unit, and FIG. 4 a circuit for operating a demagnetization circuit.

The switched-mode power supply shown in FIG. 1 operates on the flyback-converter principle and comprises an input connected to a mains voltage UN, which is converted by means of a rectifier G1 and a capacitor 3 to a smoothed DC voltage U1. The switched-mode power supply comprises a transformer Tr with a primary winding W1 coupled to the voltage U1 and connected in series with a switching transistor T1. In this embodiment, as a driver stage for the switching transistor T1 an integrated circuit 7 is used, although other solutions, with discrete transistor stages operating both in free-running and synchronized fashion, are also possible.

A resistor 8 connected to the voltage U1 is used to enable the switched-mode power supply to start up. During operation, the switched-mode power supply is itself supplied with voltage by means of an auxiliary winding W4, a diode 12, a capacitor 9 and a resistor 10. The switching transistor T1 is operated by the integrated circuit 7, for example using a square-wave signal 6 at a frequency usually higher than 16 kHz.

The switched-mode power supply uses secondary windings W2 and W3 of the transformer Tr to generate output voltages U2 and U3, which are smoothed by rectifiers G2, G3 and capacitors 17, 18. The output voltages U2 and U3 are stabilized by a control loop, the control loop being connected to the output voltage U3 in this embodiment. The control loop is represented in this embodiment in simplified form by a resistor 14 and an optocoupler 13, for transmitting a feedback signal to a control input 1 of the integrated circuit 7.

To the control loop an output 19 of a microprocessor 16 is coupled in simplified form, via a resistor 15. The microprocessor 16 uses in particular a digital signal, for example a CMOS signal, to start the burst mode and the normal mode of the switched-mode power supply via output 19. For example, when the output 19 is "high", then the control loop is enabled and the switched mode power supply is in a normal mode in which the output voltages U2 and U3 are regulated via the control loop. When the output 19 provides a "low" signal, then the control loop is coupled to a low potential, and the switched mode power supply therefore disabled.

A circuit for coupling an output of a microprocessor to a control loop of a switched mode power supply is shown and explained in more detail in U.S. Pat No. 6,434,030. In this reference, the microprocessor generates in particular a burst mode operation in the standby mode of the switched mode power supply. In this operating mode, the standby losses of the switched mode power supply can be kept very low.

According to the invention, the output 19 is also coupled to a demagnetization circuit for providing a demagnetization of a picture tube, for example for a picture tube of a television set or a computer monitor. The arrangement comprises therefore a logical gate 23, for example an AND gate, to which inputs an operating voltage U4 and the output 19 of the microprocessor 16 is coupled. The output 19 of the microprocessor 16 is in particular a single pin for providing a signal Uc, which contains the information for controlling the low power mode as well as for controlling the demagnetization circuit.

Figure 2:
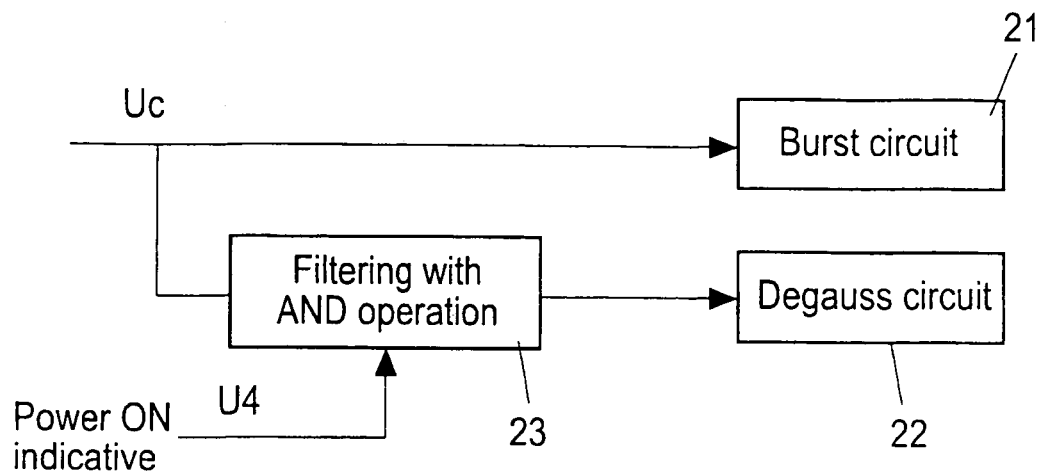
Figure 4:
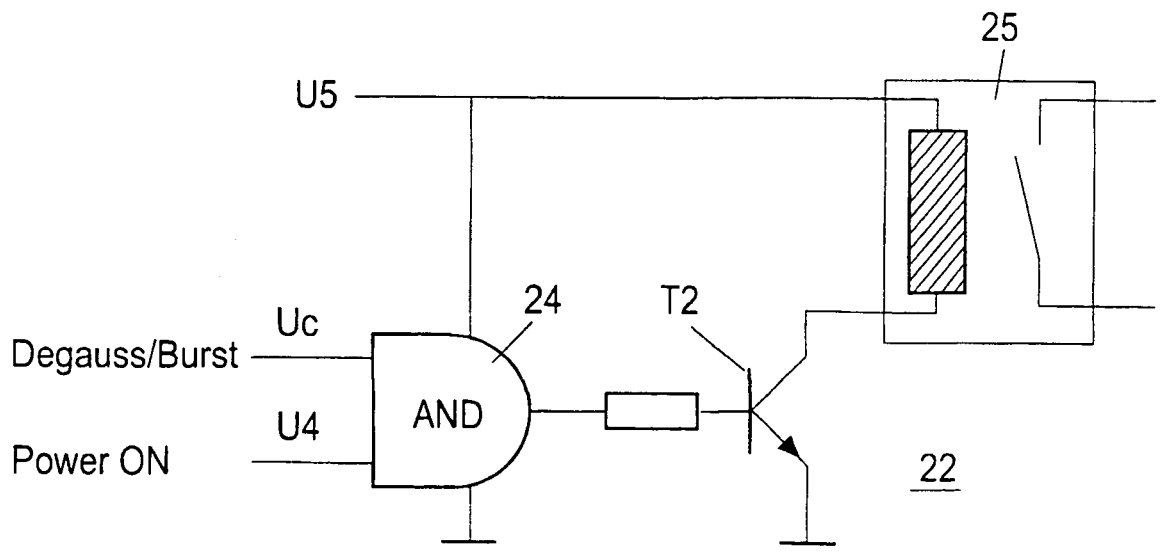

The operation of the demagnetization circuit is shown in more detail in FIG. 2. The signal Uc from the output 19 is coupled to a burst circuit 21, for example to the optocoupler 13 of the control loop of a switched mode power supply as shown in FIG. 1, and coupled to a demagnetization circuit 22 via a logical gate 23, for filtering the signal from output 19 with a power on indicative signal. The gate 23 provides an AND operation, and the power on indicative signal is for example a supply voltage U4 only present in the normal mode of the switched mode power supply, for allowing the signal from the output 19 to pass to the demagnetization circuit 22 only in normal mode. The logic gate 23 is in particular an AND gate, as shown in FIG. 4.

Figure 3:
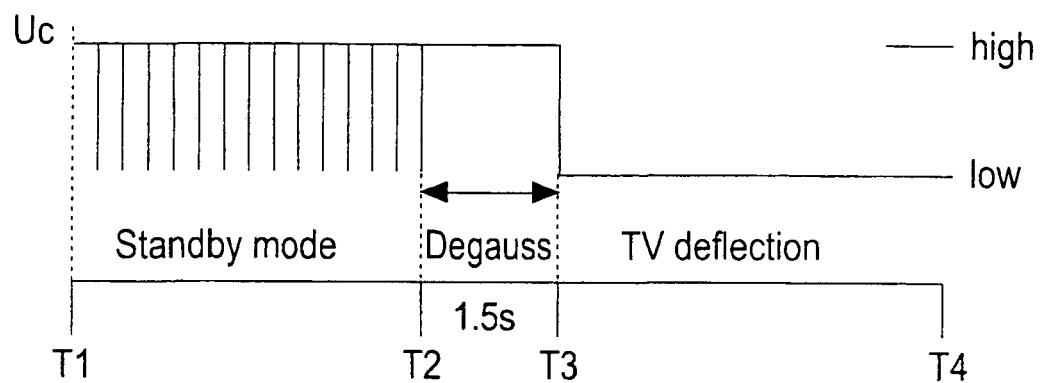

FIG. 3 shows in more detail the signal Uc from output 19, for controlling the burst circuit 21 and the demagnetization circuit 22. In a first time interval T1-T2 the power supply is in a low power standby burst mode, being controlled by the control signal Uc. In this embodiment, when the control signal Uc is "high", the switched mode power supply is off, and when Uc is "low", the switched mode power supply is operating and regulated by output voltage U3. For generating the burst mode during time interval T1-T2, the control signal Uc is a periodic square wave signal with short time periods, in which the voltage Uc is "low". The pulse width ratio is close to 1, for a low power consumption of the switched mode power supply. Preferred values are for example a pulse width ratio with "high"=95% and "low"=5%.

The circuit arrangement as described is arranged for example within a television set. At time T2 a user switches the television set on, and the switched mode power supply therefore switches to the normal mode for supplying all circuits of the television set with operating voltages. The signal Uc from output 19 is then kept "high" for a time interval T2-T3, for providing a demagnetization of the picture tube of the television set. The interval T2-T3 has in particular a duration of about 0,5 sec to 3 sec, for example 1.5 sec. Because after time T2 already a power on indicative signal is present at the second input of gate 23, the output of gate 23 is high for enabling the demagnetization circuit 22. A demagnetization circuit for a picture tube is known for example from DE-A-3830931.

After time T3 the signal Uc switches to "low" for disabling the demagnetization circuit 22. This is a preferred mode during normal operation of a television set, because then the power consumption of the demagnetization circuit 22 is zero. After time T3, the deflection of the television set is starting and the picture appears on the picture tube.

A preferred embodiment for coupling the output 19 of the microprocessor to a demagnetization circuit 22 is shown in FIG. 4. The demagnetization circuit 22 comprises a relay 25, via which the demagnetization coils (not shown) of the demagnetization circuit 22 are operated. The control signal Uc and the power on indicative signal U4 are applied to an AND gate 24. The AND gate 24 and the relay 25 are supplied with an operating voltage U5, which is present during normal mode as well as in standby mode. As explained, during the time interval T2-T3 both inputs of the AND gate 24 are "high", and then the output of AND gate 24 is also "high", therefore switching through a transistor T2, which controls the operation of the relay 25.

The power on indicative signal U4 can be any signal being "low" during a low power standby mode and "high" during a normal mode. With the signal U4 it is therefore possible to disable the demagnetization circuit 25 during the low power mode, which is particularly important when a low power burst mode is used, because during the time interval T1-T2 the demagnetization circuit would be operated by the square wave signal Uc. The relay 25 would then switch on and off with a comparatively high frequency, which would wear out the relay 25 and would lead to additional power losses in the standby mode.

The present invention is not limited to the embodiment as shown and described with regard to the figures, and various modifications come possible for a person skilled in the art without departing from the scope of the invention. For example, the invention is useable for all appliances comprising a demagnetization circuit. As the "high" signals also any other logical "enable" signals may be used. In the embodiment shown in FIG. 1, mains isolation is provided by the transformer Tr and the optocoupler 13. Other embodiments without mains isolation, for example battery-powered devices, are also possible.

The invention claimed is:

1. Arrangement comprising
   a microprocessor,
   a demagnetization circuit,
   a logical AND combination, and
   a switched mode power supply having a normal mode and a low power mode, the microprocessor being coupled via a same output to the demagnetization circuit and to the switched mode power supply for controlling the low power mode and the demagnetization circuit by means of a control signal, wherein the control signal and an on-indicative signal only present in the normal mode are connected each to an input of said logical AND combination for coupling said control signal to the demagnetization circuit in dependency of the power on-indicative signal, and the control signal being in the low power mode a square wave signal for providing a burst mode.

2. Arrangement according to claim 1, wherein the microproprocessor comprises a single pin for controlling the low power mode as well as the demagnetization circuit.

3. Arrangement according to claim 1, wherein the logical AND combination is an AND gate, for controlling the demagnetization circuit.

4. Arrangement according to claim 1, wherein the power on-indicative signal is a supply voltage being provided by the switched mode power supply only during the normal mode.

5. Arrangement according to claim 1, wherein a duty cycle of the square wave signal defines the switching cycles of the switched mode power supply.

6. Arrangement according to claim 1, wherein the control signal is "enable" for a time sufficient to provide a demagnetization of a picture tube, when the switched mode power supply is switched to the normal mode.

7. Arrangement according to claim 5, wherein the "enable" signal has a duration of 0,5 to 3 sec., and is switched to "low" after the demagnetization.

8. Arrangement comprising
a microprocessor,
a demagnetization circuit,
a logical AND combination, and
a switched mode power supply having a normal mode and a low power mode, the microprocessor being coupled via a same output to said demagnetization circuit and to said switched mode power supply for controlling said low power mode and the demagnetization circuit by means of a control signal, wherein the control signal and an on-indicative signal only present in said normal mode are connected each to an input of said logical AND combination for coupling the control signal to the demagnetization circuit in dependency of the power on-indicative signal.

9. Display unit, comprising an arrangement according to claim 8.

* * * * *